United States Patent [19]
Reid et al.

[11] Patent Number: 5,468,104
[45] Date of Patent: Nov. 21, 1995

[54] WALL NUT ASSEMBLY

[75] Inventors: Leonard F. Reid, Bellevue; Charles M. Copple, Kent, both of Wash.

[73] Assignee: Fatigue Technology, Inc., Seattle, Wash.

[21] Appl. No.: 288,298

[22] Filed: Aug. 10, 1994

[51] Int. Cl.⁶ .................... F16B 37/04; F16B 39/28
[52] U.S. Cl. .................... 411/113; 411/183; 411/432
[58] Field of Search ........................ 411/111, 112, 113, 411/183, 173, 177, 432, 84, 85, 104

[56] References Cited

U.S. PATENT DOCUMENTS

| | | |
|---|---|---|
| 2,144,553 | 1/1939 | Simmonds . |
| 3,164,191 | 1/1965 | Grimm et al. . |
| 3,259,164 | 7/1966 | Hernadi . |
| 3,446,261 | 5/1969 | Dey . |
| 4,571,135 | 2/1986 | Martin et al. ............... 411/85 |
| 4,575,295 | 3/1986 | Robentisch ................ 411/85 |
| 4,695,212 | 9/1987 | Berecz ..................... 411/85 |
| 4,790,701 | 12/1988 | Baubles .................... 411/85 |
| 4,863,327 | 9/1989 | Poupiter ................... 411/112 |
| 4,895,484 | 1/1990 | Wilcox .................... 411/85 |
| 5,096,349 | 3/1992 | Landy et al. ............... 411/108 |
| 5,245,743 | 9/1993 | Landy et al. ............... 29/523 |
| 5,380,136 | 1/1995 | Copple et al. ............. 411/113 X |
| 5,405,228 | 4/1995 | Reid et al. ............... 411/113 X |

*Primary Examiner*—Neill R. Wilson
*Attorney, Agent, or Firm*—Delbert J. Barnard

[57] ABSTRACT

A tubular stem (S) at one end of a nut cage (NC) is inserted into an opening in a wall and is expanded to connect it to the wall and to coldwork the wall material surrounding the opening for fatigue life enhancement. The nut cage (NC) includes a cage floor region (22) for receiving the central portion (46) of a nut (N). One end portion (48) of the nut base (44) is inserted into a socket (22). A second end portion (50) of the nut base (44) is moved axially into a channel (28). Then a snap ring (SR) is installed and moved to place a closed portion (52) over the nut base end portion (50). The socket (26) and channel (28) restrain the nut base (44) against rotation in the nut cage (NC). The channel (28) and a portion of the snap ring (SR) which closes the channel (28) and the axial boundaries of the socket (26) restrain the nut base (44) from axial movement out from the nut cage (NC).

26 Claims, 5 Drawing Sheets

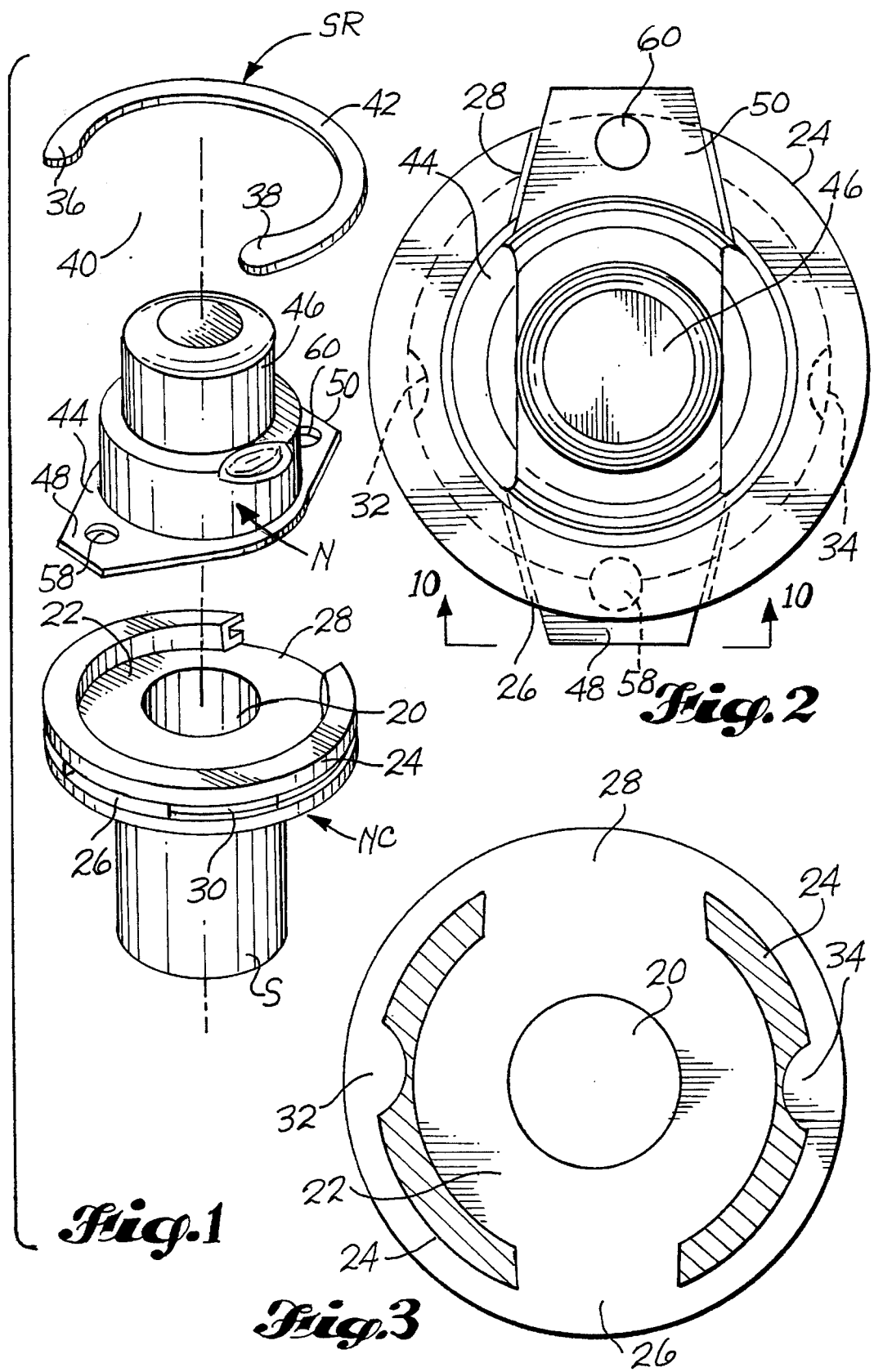

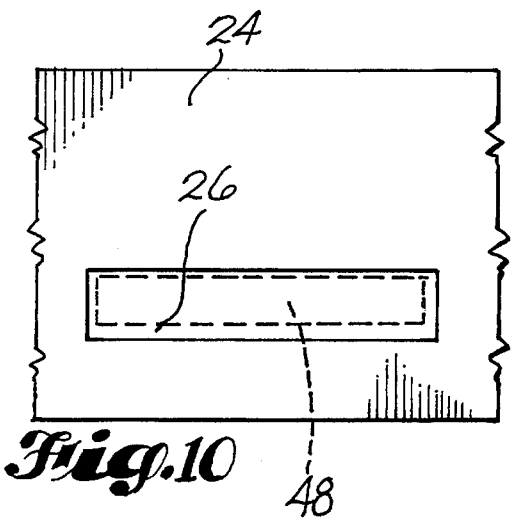
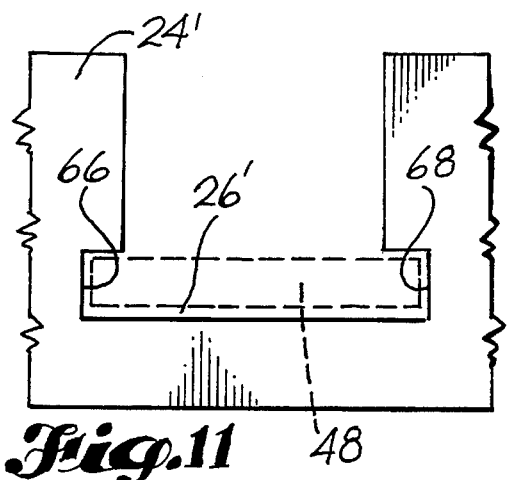
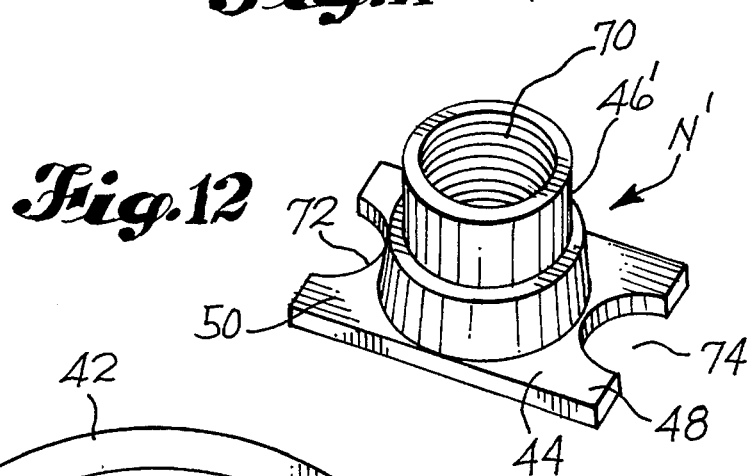
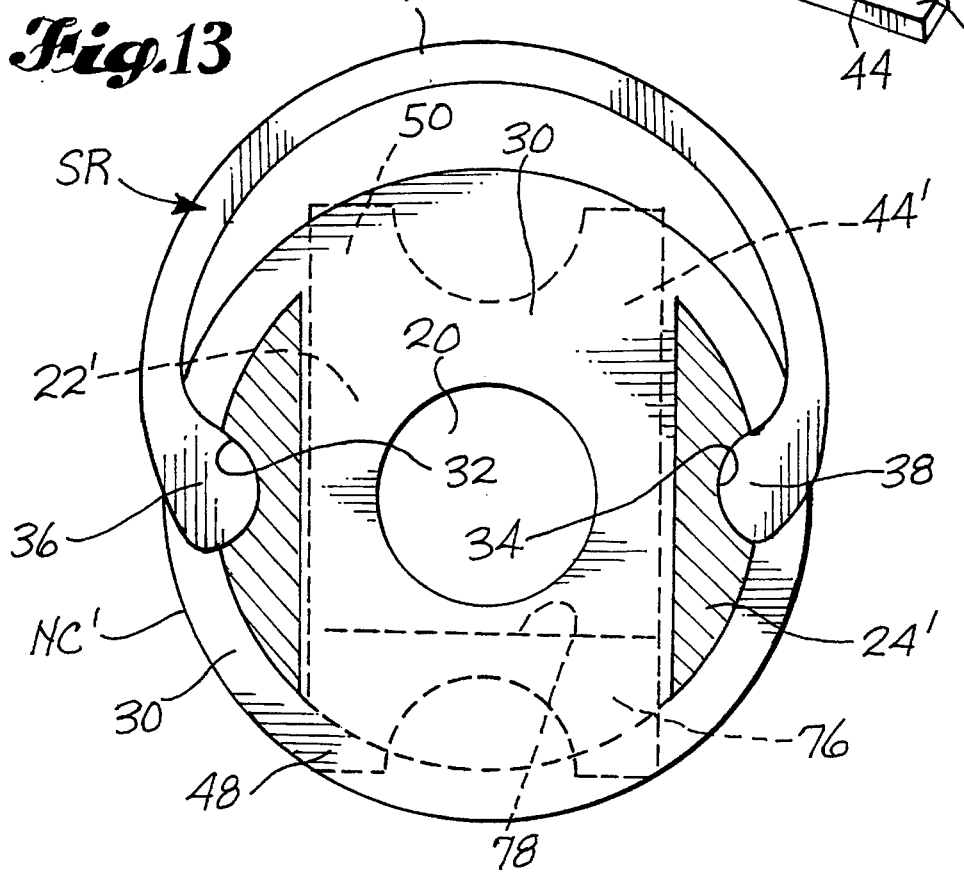

WALL NUT ASSEMBLY

TECHNICAL FIELD

The present invention relates to wall nut assemblies composed of a nut and structure for connecting the nut to a wall at the location of a bolt receiving opening in the wall. More particularly, the invention relates to the provision of improved structures for holding the nut and connecting it to the wall. These strucutres are herein somtimes referred to as "nut mounting structures."

BACKGROUND INFORMATION

The background of what may termed the nut plate technology is discussed in U.S. Pat. No. 5,096,349, granted Mar. 17, 1992 to Michael A. Landy, et al., in U.S. Pat. No. 5,245,743, granted Sep. 21, 1993 to Michael A. Landy, et al., in U.S. application Ser. No. 08/032,340, filed Mar. 16, 1993, by Charles M. Copple, et al., and in U.S. patent application Ser. No. 08/121,077, filed Sep. 14, 1994, by Charles M. Copple, et al. These patents and applications disclose nut mounting structures characterized by a tubular stem that fits into a bolt receiving opening in a wall and is radially expanded within the opening to connect the nut mounting structure to the wall. The tooling and methods disclosed in these patents and applications for expanding the tubular stem are to be considered a part of the present disclosure. The disclosures of these patents and applications are hereby incorporated herein by this specific reference to them.

There is a need for a nut mounting structure that is adapted for easy placement and retention of the nut following connection of the nut mounting structure to the wall. There is also a need for a nut mounting structure for use with a sealed nut that will hold the sealed nut in a sealed position when no bolt is connected to and pulling the nut into a sealed position. The wall nut mounting structure of this invention fulfills these needs.

DESCRIPTION OF THE INVENTION

Nut mounting structures according to the invention are adapted for use with a nut that comprises a nut base having an inner side and an outer side, a nut central portion projecting axially from the outer side of the nut base, and first and second opposite end portions, each end portion projecting radially outwardly from the nut central portion. Nut mounting structures according to the invention are basically characterized by a nut cage that is mountable on a wall at an opening in the wall. The nut cage includes a nut cage base having a base opening that is positioned to be aligned with the opening in the wall when the nut cage is mounted on the wall. The nut cage further includes a net central portion receiving region and a rim wall or fence at least partially surrounding this region. The fence projects axially from the nut cage base. The socket is adapted to engage and restrain the first end portion of the nut base against both circumferential and axial movement. The fence further includes a channel diametrically opposite the socket. This channel also extends radially outwardly from the nut central portion receiving region. The channel is sized to receive the second end portion of the nut base and is adapted to engage and restrain the second end portion of the nut base against circumferential movement. The nut mounting structure includes a nut retainer connectable to the nut cage. The nut retainer includes a bridge portion that is adapted to bridge across the channel. In use, the nut cage is mounted on a wall at a wall opening. The nut is placed in the nut cage, with the nut central portion positioned in the nut central portion receiving region, with the first end portion of the nut base positioned in the socket, and with the second end portion of the nut base positioned in the channel. Then, the nut retainer is positioned to place its bridge portion across the channel so that it will block movement of the second end portion of the nut base axially out from the channel.

In accordance with one aspect of the invention, the socket is a radial tunnel opening in the fence. According to another aspect of the invention, the socket is composed of confronting slots formed in circumferentially spaced apart portions of the fence. The slots are sized to receive opposite end portions of the first end portion of the nut base.

In preferred form, the nut retainer is a substantially C-shaped snap ring, adapted to be snap-fitted onto the nut cage fence. The snap ring includes an open region and a closed region. A central part of the closed region provides the bridge portion which extends across the channel and blocks movement of the second end portion of the nut base axially out from the channel.

In preferred form, the fence includes a circumferentially extending outside groove (i.e. a girth groove) for receiving the snap ring. The groove includes substantially diametrically opposite recesses shaped for receiving end portions of the snap ring. The snap ring has a "ready" position in which its end portions are within the recesses and the bridge portion is positioned radially outwardly from the fence a sufficient distance to allow insertion of the nut into the nut cage by a motion which includes moving the second end portion of the nut base axially into the channel. The snap ring has a "secure" position in which it surrounds the fence and its bridge portion is positioned over the second end portion of the nut base. When the snap ring is in this position, its bridge portion converts the channel into a tunnel opening.

According to an aspect of the invention, the nut cage further includes a tubular stem which extends axially from the nut cage base on the side of the nut cage base opposite the fence. The tubular stem is adapted to fit into the wall opening. In preferred form, the tubular stem is constructed from a material that will permanently expand in response to expansion tooling being moved through it. The tubular stem is expanded into a tight interference fit with the side surface of the hole in the wall. In this manner, the nut holding structure is firmly secured to the wall at the opening in the wall.

The nut mounting structure of the invention is particularly adapted for mounting a sealed nut in a sealed position when no bolt is connected to and pulling the nut into a sealed position. When the first end portion of the nut base is within the socket and the second end portion of the nut base is within the channel and the bridge portion of the retainer is across the channel, the bridge portion and a socket wall press against the end portions of the nut base and move a seal ring that is on the inner base into tight sealing engagement with a base surface of the nut cage where it surrounds the base opening.

Other objects, features and advantages of the invention will be hereinafter described in greater detail, as a part of the description of the best mode and the alternative embodiments of the invention.

BRIEF DESCRIPTION OF THE DRAWINGS

In the drawing, like reference numerals are used to designate like parts throughout the several views and:

FIG. 1 is an exploded pictorial view of a preferred embodiment of the invention, such view showing a snap ring positioned above a sealed nut and the sealed nut positioned above a nut cage portion of a nut mount;

FIG. 2 is a top plan view of the nut and the nut mount, minus the snap ring;

FIG. 3 is a sectional view taken substantially along line 3—3 of FIG. 6, minus the snap ring;

FIG. 10 is a fragmentary view taken substantially from the aspect of line 10—10 in FIG. 2, with an end portion of the nut shown in broken lines, and with the snap ring groove omitted;

FIG. 11 is a view like FIG. 10, but showing a modified form of socket;

FIG. 12 is a pictorial view of another form of nut; and

FIG. 13 is a view similar to FIG. 4 of a modified nut mount, such view including a broken line plan showing of a FIG. 12 nut positioned within the nut cage.

BEST MODE FOR CARRYING OUT THE INVENTION

Figure 4:
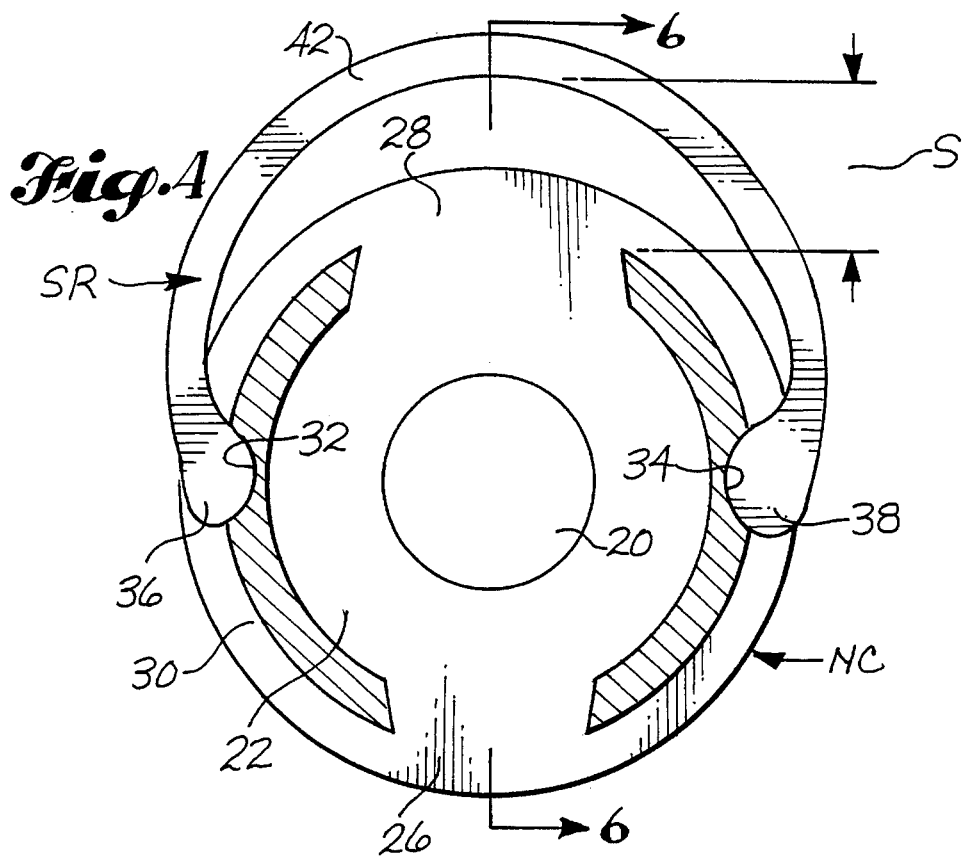
FIG. 4 is a transverse sectional view taken substantially along line 4—4 of FIG. 6.

Referring to FIG. 1 of the drawing, in preferred form, the wall nut assembly of the invention comprises a nut N, a single hole mounted nut cage NC, and a nut retainer in the form of a snap ring SR.

Figure 8:
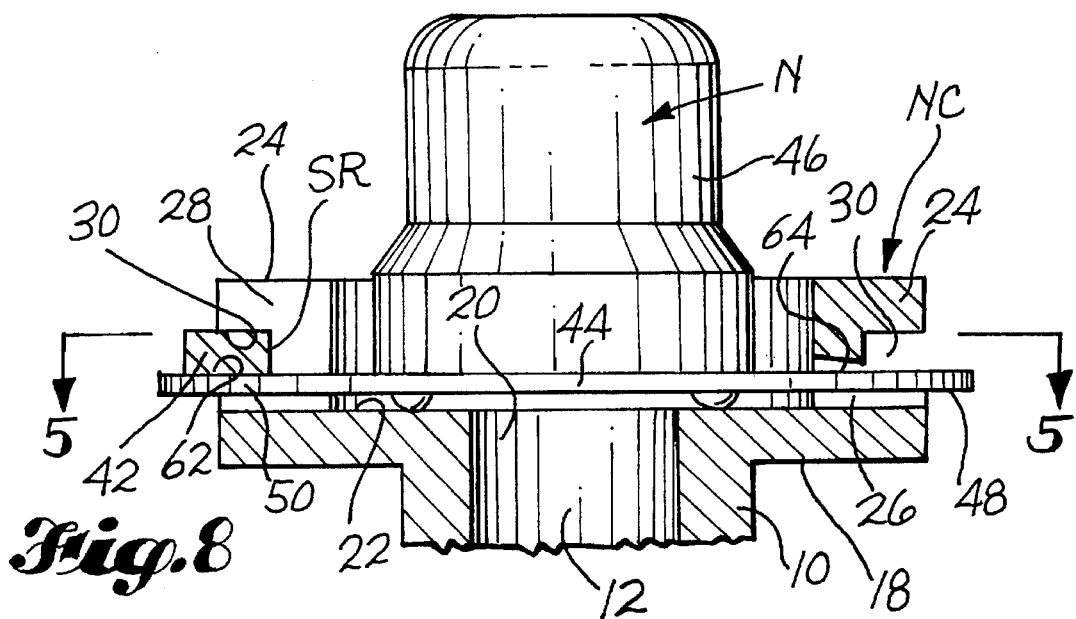
FIG. 8 is a view taken substantially along line 8—8 of FIG. 5 minus the nut.
Figure 9:
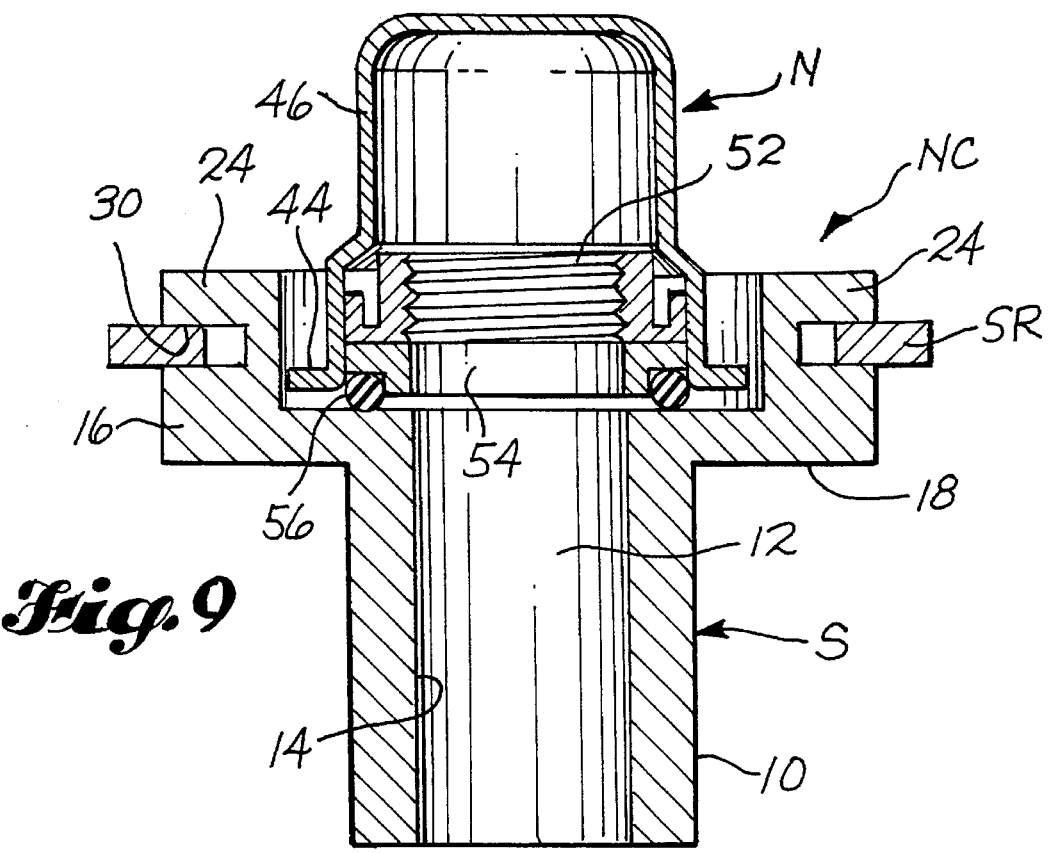
FIG. 9 is a longitudinal sectional view taken substantially along line 9—9 of FIG. 5, such view showing a sealed nut within the nut cage.

As best shown by FIG. 9, the nut cage NC is at one end of a tubular stem S. As will hereinafter be described in some detail, the stem S has an outside diameter that is sized to be snugly received within a wall opening (not shown). Stem S includes an axial bolt receiving opening 12 having a diameter 14 that is sized to receive the shank portion of a bolt (not shown) which screws into the nut N. The nut cage NC includes a nut cage base 16 which is formed integrally with the stem S. Nut cage base 16 includes a base shoulder 18 which when the nut cage NC is mounted is in contact with a surface of the wall on which the nut cage NC is mounted. As clearly shown in FIGS. 1 and 3–9, the nut cage base 16 includes a central base opening 20 that is an end portion of the bolt receiving opening 12. The nut cage base 16 also includes a cage floor region 22 for receiving a central portion of the nut N. Cage floor region 22 is partially surrounded by a cage fence 24. Fence 24 is formed to include a radial socket 26, a radial channel 28 and an outside groove 30. In the preferred embodiment, radial socket 26 is a radial tunnel opening in the fence 30. It extends radially outwardly from the cage floor region 22. The channel 28 is diametrically opposite the socket 26. The snap ring groove opens radially outwardly. For reasons that will hereinafter be explained, the snap ring groove 30 includes a pair of generally diametrically opposite recesses 32, 34, sized to receive end portions 36, 38 of the snap ring SR.

Figure 5:
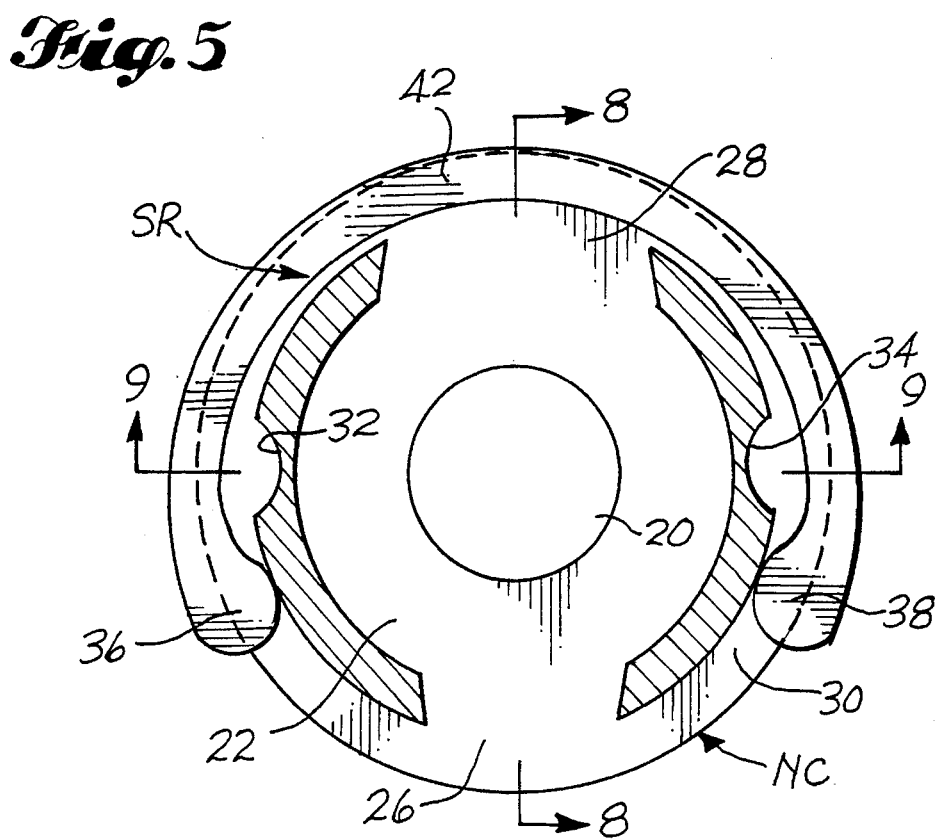
FIG. 5 is a transverse sectional view taken substantially along line 5—5 of FIG. 8, minus the nut.

As shown by FIGS. 1, 4 and 5, the snap ring SR is substantially C-shaped. It is a ring from which an arcuate segment has been removed to form a ring opening 40. Ring opening 40 may measure about 50–60 degrees, for example. The ring body 42 may measure about 300–310 degrees, for example.

In preferred form, the nut N is a sealed nut. It includes a nut base 44 and a nut central portion 46 which projects axially from the nut base 44. As best shown in FIGS. 2 and 6–8, the nut base 44 includes first and second end portions 48, 50. End portion 48 extends radially outwardly from the nut central portion 46 and is adapted to fit within the socket 26. In like fashion, end portion 50 extends radially outwardly from the nut central portion 46 and it is adopted to fit within the channel 50. When nut base end portion 48 is within socket 26 and nut base end portion 50 is within channel 28, the nut central portion 46 is located within the cage floor region 22.

Figure 6:
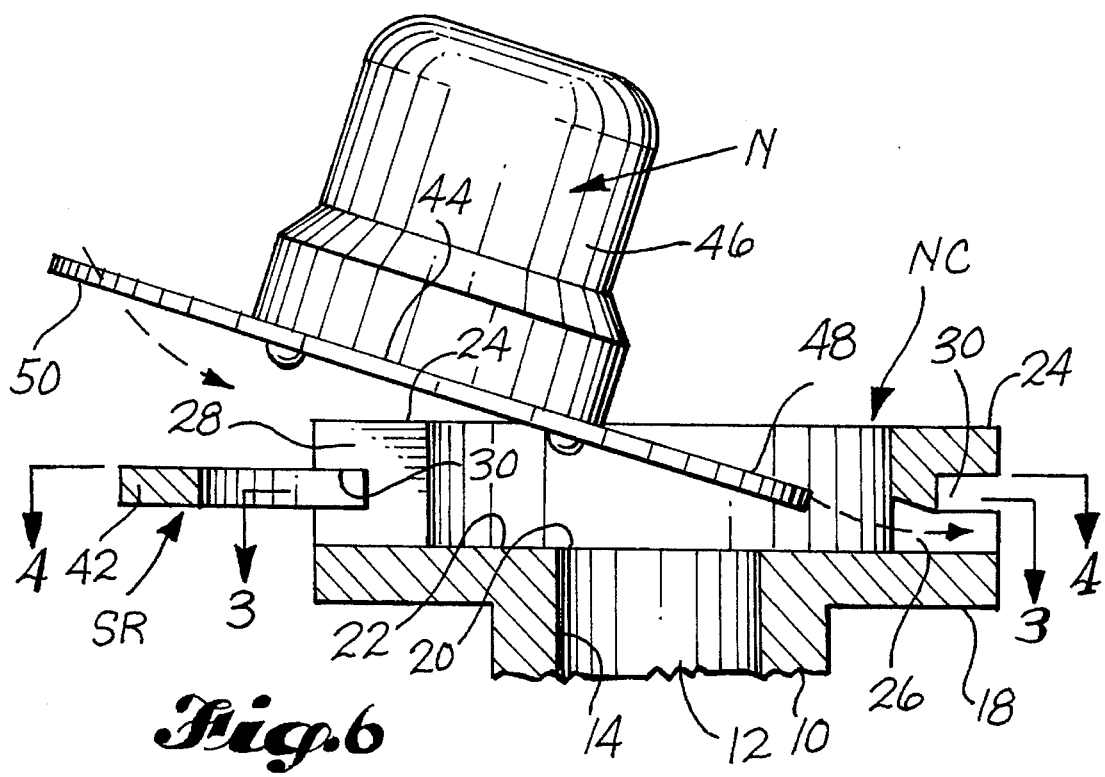
FIG. 6 is a fragmentary sectional view taken substantially along line 6—6 of FIG. 4, such view showing a nut being moved into the nut cage.
Figure 7:
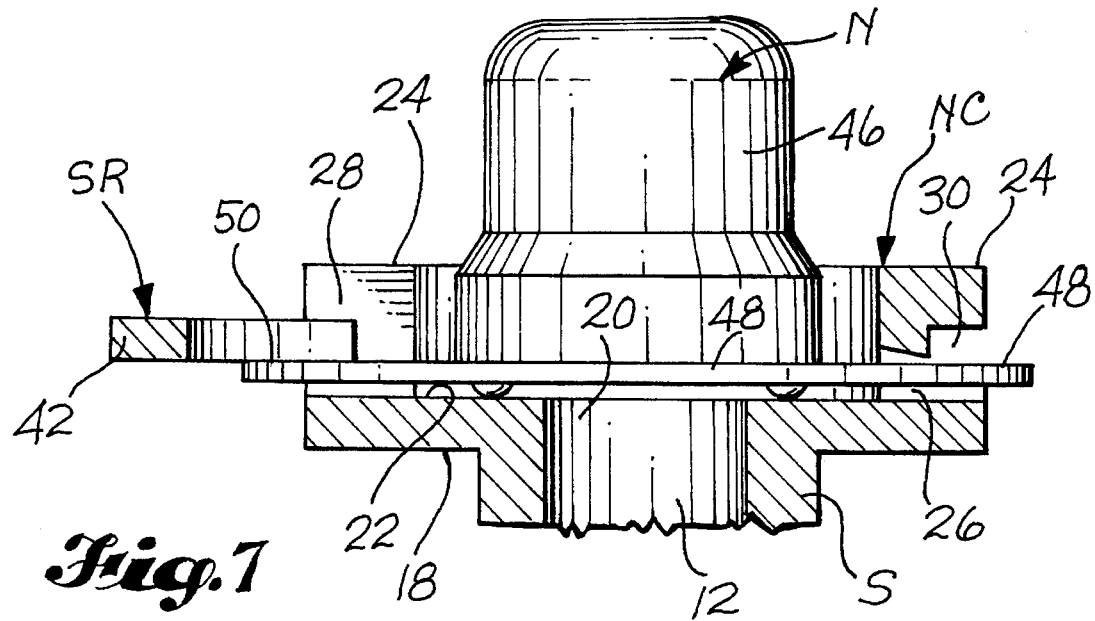
FIG. 7 is a view like FIG. 6, showing the nut in the nut cage.

The snap ring SR is snap-fitted onto the nut cage NC. Specifically, the end portions 36, 38 of the snap ring SR are inserted into the groove 30. Then, the snap ring SR is moved radially until its end portions 36, 38 snap into the recesses 32, 34, placing the snap ring SR in the position shown by FIG. 4, viz. the snap ring "ready" position. This provides a space S that permits insertion of the nut N into the nut cage NC in a manner that will now be described. Referring first to FIG. 6, the snap ring SR is in the "ready" position shown by FIG. 4. The nut N is then picked up and moved in the manner shown in FIG. 6, with the nut base end portion 48 directed into the socket 26. The space S allows radial clearance for the nut base end portion 50 so that the nut N can be moved in the manner illustrated in FIG. 7, ultimately into the nut cage NC, into the position shown by FIG. 7. When the nut N is within the nut cage NC, the snap ring SR is pushed radially inwardly into the position shown by FIGS. 5 and 8, viz. the snap ring "secure" position. When snap ring SR is its secure position, the central part of snap ring portion 42 spans across the channel and changes the channel opening to a tunnel opening, substantially like the socket 26 on the opposite side of the nut cage NC. As can be appreciated, socket 26 restrains nut base end portion 48 against both circumferential and axial movement. The side boundaries of channel 26 restrain nut base end portion 50 against circumferential movement. The central part of snap ring portion 42 restrains nut base end portion 50 against axial movement. The fence 24 restrains the nut central region 46 against radial movement out from the nut cage NC. The fence 22, the socket 26 and the channel 28 are sized to allow a limited amount of radial float of the nut N in all directions while at the same time restraining the nut N against movement out from the nut cage NC.

The sealed nut N is old per se. Its central region 46 includes an outer closed housing projecting from the nut base 44, an internally threaded inner nut member 52, and a retaining ring 54. Retainer ring 54 holds the nut member 52 within the housing. Retainer ring 54 also includes an annular groove in which an O-ring seal 56 is located. The sealed nut N that is illustrated in FIG. 1 comes with openings 56, 58 which in prior art installations of the nut N receive rivets which are used to connect the nut base 44 to a wall. Openings 56, 58 are not used when the nut N is installed in accordance with the present invention.

In the preferred embodiment, there is contact between snap ring portion 42 and nut base end portion 50 at location 62 and contact between the upper wall of socket 26 and nut base end portion 48 at location 64 (as illustrated in FIG. 8). The axial dimension of socket 26 and the axial space between snap ring portion 42 and the floor of the channel 28 are such that the O-ring seal 56 must be compressed somewhat in order for nut base 48 to fit within socket 26 and nut base end portion 50 to fit below snap ring 42 when the nut N is in place and the snap ring SR is in its secure position. As a result, the seal ring 56 is pressed into sealing engagement with the base surface 22 of the nut cage NC even though no bolt is pulling on the nut N. The nut inner member is restrained against rotation relative to the housing it is in, but it is permitted to float radially somewhat in order to facilitate mating of its internal with the external threads on the bolt (not shown) which connects to nut N. Thus, the contact between seal ring 56 and surface 20 may restrain the nut N against lateral float within the nut cage NC and the radial float of inner nut member 52 will provide the amount of movement required for alignment between the threads on the bolt with the threads in the nut.

FIG. 10 is a fragmentary elevational view looking endwise of the socket 26. In this view, the stem 10 is omitted and the groove 30 is omitted. This is done for the purpose of more clearly showing that the socket 26 is a tunnel opening in the fence 24. FIG. 11 is a view like FIG. 10 but of a modified construction of the socket 26'. In this embodiment, a sidewall portion of the fence 24' is removed, so as to form a radial channel through the fence 24' which has confronting slots 66, 68 formed in circumferentially spaced apart regions of the fence 24'. These slots 66, 68 are sized to receive opposite edge portions of the nut base end portion 48.

FIG. 12 shows a standard nut plate nut N' having a nut base 44' and a nut central portion 46'. Nut central portion 46' is formed integrally with the nut base 44'. It includes an internally threaded nut opening 70. This type of nut includes radially outwardly opening recesses 72, 74 in the nut base end portion 76, 78. The recesses 72, 74 perform no function when the nut N' is used in accordance with the present invention. FIG. 13 shows a plan outline of the nut base 44' positioned within nut cage NC', the nut receiving space (22' of which has been modified to receive the nut N'). There is no change in the snap ring SR. The recesses 32, 34 are the same. The interior shape of the fence 24' is changed so as to conform the space 22' to the nut N'. In FIG. 13 the portion of the fence 24' which extends over nut base end portion 48 is depicted by broken lines and is designated as 76. This portion 76 includes an end surface 78 that contacts a side portion of nut part 46' to block radial travel of the nut N out from the nut cage in the direction of socket 26. When snap ring SR is installed, following placement of the nut N' in the nut cage, the closed portion 46 of the snap ring SR is positioned to contact nut part 46' and prevent radial movement of the nut 46' out from the nut cage in the direction of channel 30.

Preferably, the nut mount is connected to a wall by inserting its stem S into an opening in the wall and then pulling a mandrel (with or without a split sleeve) through the stem S so as to radially expand the stem S. The tooling for this type of installation and the installation steps, are disclosed in U.S. Pat. No. 5,096,349, granted Mar. 17, 1992, and owned by Fatigue Technology Inc., the assignee of this application. The stem S is constructed from a material that will allow it to be expanded radially by expansion tooling and in response to such radial expansion on it will become permanently larger in diameter within the opening in the wall. As a result, the expanded stem S makes a tight interference fit with the sides of the opening to in that manner secure the nut mount to the wall. This type of installation is preferred because it requires the formation of only a single hole in the wall at the location of each nut and this is the hole that receives the bolt that is connected to the nut. In preferred form, the expansion tooling includes both a mandrel and a split sleeve. The split sleeve is placed on a small diameter portion of the mandrel, the stem S is inserted into a wall opening, and then the mandrel and split sleeve are inserted into the stem S, from the in thereof opposite the nut cage. Then the mandrel is pulled back through the split sleeve. The mandrel includes an enlarged end which as it moves axially through the split sleeve causes a radial expansion of both the split sleeve and the stem S. The expansion that occurs is sufficient to cause a permanent increase in the outside and inside diameters of the stem S. This radial expansion of the stem S both secures the nut mount to the wall and introduces fatigue life-enhancing compressive residual stresses in the wall immediately about the stem S. These stresses protect the fastener hole from the action of cyclic potential stresses that propagate fatigue cracks.

As stated above, the radial expansion also creates a tight interference fit between the stem S and the sidewall of the fastener hole. This tight interference fit secures the nut mount to the wall and provides resistance to torque and removal forces encountered during fastener installation and removal. The outer surface of the stem S may be machined or otherwise treated in order to give it an increased coefficient of friction. For example, the nut mount may be turned on a lathe, and a series of small grooves or ridges may be machined in the outer surface of the stem S or the outer surface of the stem S may be roughened by use of a sand-blasting technique.

In preferred form, the nut mount is furnished to the customer with the snap ring SR attached, but in the "ready" position shown by FIG. 6. The user installs the nut mount by use of cold-expansion, in the manner described above. Then, the nut N is inserted into the nut cage, in the manner described above in connection with FIGS. 6–8.

An advantage of the nut mount of this invention is that a sealed nut can be put into a sealed condition during times when a bolt is not connected to the nut N. This is important in many installations.

It is within the scope of invention to secure the nut mount within a wall opening by means other than cold expansion. For example, the opening in the wall can be threaded and matching threads can be placed on the stem S enabling the stem S to be screwed into the threaded opening. Or, the stem S could be made longer than the opening into which it is inserted so that it has an end portion which projects out from the opening on the backside of the wall. Following insertion of the stem S in the wall opening, the projecting end portion can be flared or crimped to in that manner connect the nut mount to the wall. Or, the nut cage can be secured to the wall by means other than the use of a stem within the fastener opening. Also, the nut mount of the invention can be used in a wide variety of wall members and materials. It can be used in metal members, composites and various structural plastics.

It is to be understood that many variations in size, shape and construction can be made to be illustrated in the above-described embodiments of the nut mount without departing from the spirit and scope of the present invention. Some of the features of the preferred embodiment may be utilized without other features. Therefore, it is to be understood that the described and illustrated embodiments are non-limitive and are for example purposes only. The scope of the invention is not to be determined by the disclosed features of the disclosed embodiments but rather only by the following claims construed in accordance with the accepted rules of patent claim construction, including use of the doctrine of equivalents.

What is claimed is:

1. A wall nut assembly, comprising:

a nut comprising a nut base having an inner side and an outer side, and a nut central portion projecting axially from said nut base on said outer side, said nut base including first and second opposite end portions, each said end portion projecting radially outwardly from said nut central portion;

a nut cage mountable on a wall at an opening in the wall, said nut cage including a nut cage base having a base opening positioned to be aligned with the wall opening when the nut cage is mounted on the wall, said nut cage base further including a nut central portion receiving region and a fence at least partially surrounding said region, said fence projecting axially from said nut cage base, said fence including a socket extending radially outwardly from the nut central portion receiving region, said socket being sized to receive the first end portion of the nut base, said socket being adapted to engage and restrain the first end portion of the nut base against both circumferential and axial movement, said fence further including a channel diametrically opposite the socket, said channel extending radially outwardly from the nut central portion receiving region, said channel being sized to receive the second end portion of the nut base, said channel being adapted to engage and restrain the second end portion of the nut base against circumferential movement; and a nut retainer connectable to said nut cage, said nut retainer including a bridge portion adapted to bridge across said channel, wherein in use the nut cage is mounted on a wall at a wall opening, the nut is placed in the nut cage, with the nut central portion positioned in the nut central portion receiving region, with the first end portion of the nut base positioned in said socket, and with the second end portion of the nut base positioned in the channel, and then the nut retainer is positioned to place its bridge portion across the channel so that it will block movement of the second end portion of the nut base axially out from the channel.

2. A wall nut assembly according to claim 1, wherein the socket is a radial tunnel opening in the fence.

3. A wall nut assembly according to claim 1, wherein the socket is composed of confronting slots in circumferentially spaced apart portions of the fence, said slots being sized to receive opposite edge portions of the first end portion of the nut base.

4. A wall nut assembly according to claim 1, wherein the nut retainer is a substantially C-shaped snap ring, adapted to snap onto the nut cage fence, said snap ring having an open region and a closed region.

5. A wall nut assembly according to claim 4, wherein the fence includes a circumferentially extending outside groove for receiving the snap ring.

6. A wall nut assembly according to claim 4, wherein the groove includes substantially diametrically opposite recesses for receiving end portions of the snap ring, and wherein when the end portions of the snap rings are within the recesses, the closed region of the snap ring is positioned radially outwardly from the fence a sufficient distance to allow insertion of the nut into the nut cage.

7. A wall nut assembly according to claim 1, wherein the nut is a sealed nut including an O-ring seal on the inner side of the nut base, and wherein said fence and said bridge portion of the nut retainer press on the first and second end portions of the nut base, respectively, so as to compress the O-ring seal against the nut cage base, when the nut is within the nut cage and the bridge portion of the nut retainer is positioned to bridge across said channel.

8. A wall nut assembly according to claim 7, wherein the socket is a radial tunnel opening in the fence.

9. A wall nut assembly according to claim 7, wherein the socket is composed of confronting slots and circumferentially spaced apart portions of the fence, said slots being sized to receive opposite edge portions of the first end portion of the nut base.

10. A wall nut assembly according to claim 1, wherein the retainer is a substantially C-shaped snap ring, adapted to snap onto the nut cage, said snap ring having an open region and a closed region.

11. A wall nut assembly according to claim 10, wherein the fence includes a circumferentially extending outside groove for receiving the snap ring.

12. A wall nut assembly according to claim 11, wherein the groove includes substantially diametrically opposite recesses for receiving end portions of the snap ring, and wherein when the end portions of the snap rings are within the recesses, the closed region of the snap ring is positioned radially outwardly from the fence a sufficient distance to allow insertion of the nut into the nut cage.

13. A wall nut assembly according to claim 1, wherein the nut cage further includes a tubular stem extending axially from the nut cage base, on the side of the nut cage base opposite the fence, said tubular stem being adapted to fit into a wall opening.

14. A wall nut assembly according to claim 13, wherein the socket is a radial tunnel opening in the fence.

15. A wall nut assembly according to claim 13, wherein the socket is composed of confronting slots in circumferentially spaced apart portions of the fence, said slots being sized to receive opposite edge portions of the first end portion of the nut base.

16. A wall nut assembly according to claim 13, wherein the retainer is a substantially C-shaped snap ring, adapted to snap onto the fence of the nut cage, said snap ring having an open region and a closed region.

17. A wall nut assembly according to claim 15, wherein the fence includes a circumferentially extending outside groove for receiving the snap ring.

18. A wall nut assembly according to claim 16, wherein the groove includes substantially diametrically opposite recesses for receiving end portions of the snap ring, and wherein when the end portions of the snap rings are within the recesses, the closed region of the snap ring is positioned radially outwardly from the fence a sufficient distance to allow insertion of the nut into the nut cage, by movement of the second end portion of the nut base generally axially into the channel.

19. A wall nut assembly according to claim 13, wherein the nut is a sealed nut including an O-ring seal on the inner side of the nut base, and wherein when the nut is within the nut cage and the bridge portion of the nut retainer is positioned to bridge across and close said channel, said fence and said bridge portion of the nut retainer press on the first and second end portions of the nut base, respectively and press the O-ring seal against the nut cage base.

20. A nut mount that is firmly connectable to a wall by use of a single circular opening in the wall, comprising:
   a tubular stem having an outside diameter sized for close fit insertion into the circular opening in the wall, and a substantially uniform inside diameter;
   a nut cage at one end of the tubular stem, said nut cage including a nut cage base having a base opening of a diameter substantially equal to the inside diameter of the tubular stem, said nut cage base further including a nut central portion receiving region and a fence at least partially surrounding said region, said fence projecting axially from said nut cage base, opposite from the stem;
   a nut comprising a nut base having an inner side and an outer side, and a nut central portion projecting axially from the outer side of the nut base, said base including first and second opposite end portions, each said end portion projecting radially outwardly from said nut central portion;
   said fence including a socket extending radially outwardly from the nut central portion receiving region, said socket being sized to receive the first end portion in a nut base, said socket being adapted to engage and restrain the first end portion of the nut base against both circumferential and axial movement;
   said fence further including a channel diametrically opposite the socket, said channel extending radially outwardly from the nut central portion receiving region, said channel being sized to receive the second end portion of the nut base, said channel being adapted to engage and restrain the second end portion of the nut base against circumferential movement; and
   a nut retainer connectable to said nut cage, said nut retainer including a bridge portion adapted to bridge across said channel,
   where in use, the nut mount is mounted on a wall at a wall opening, with said stem in said opening, the nut is placed in a nut cage, with the nut central portion positioned in the nut central portion positioned in the nut receiving region, with the first end portion of the nut base position in said socket, and with the second end portion of the nut base positioned in the channel, and then the nut retainer is positioned to place its bridge portion across the channel so that it will block movement of the second end portion of the nut base axially out from the channel.

21. A nut mount according to claim 20, wherein the socket is a radial tunnel opening in the fence.

22. A nut mount according to claim 20, wherein the socket is composed of confronting slots in circumferentially spaced apart portions of the fence, said slots being sized to receive opposite edge portions of the first end portion of the nut base.

23. A nut cage assembly according to claim 20, wherein the nut retainer is a substantially C-shaped snap ring, adapted to snap onto the fence of the nut cage, said snap ring having an open region and a closed region, and wherein said bridge portion of the nut retainer is a part of the closed region of the snap ring.

24. A nut mount according to claim 23, wherein the fence includes a circumferentially extending outside groove in which the snap ring is received.

25. A nut mount according to claim 24, wherein the groove includes substantially diametrically opposite recesses for receiving end portions of the snap ring, and wherein when the end portions of the snap rings are within the recesses, the bridge portion of the snap ring is positioned radially outwardly from the fence a sufficient distance to allow insertion of the nut into the nut cage, by movement of the second end portion of the nut base generally axially into said channel.

26. A nut mount according to claim 20, wherein the nut is a sealed nut including an O-ring seal on the inner side of the nut base, and wherein when the nut is within the nut cage and the bridge portion of the nut retainer is positioned to bridge across said channel said fence and said bridge portion of the nut retainer press on the first and second end portions of the nut base, respectively, so as to press the O-ring seal against the nut cage base.

* * * * *